US008846204B2

(12) United States Patent  (10) Patent No.: US 8,846,204 B2
Lu et al.  (45) Date of Patent: Sep. 30, 2014

(54) LAMINATE FILM AND METHOD OF MAKING THE SAME

(75) Inventors: Pang-Chia Lu, Pittsford, NY (US); George F. Cretekos, Farmington, NY (US)

(73) Assignee: ExxonMobil Oil Corporation, Irving, TX (US)

( * ) Notice: Subject to any disclaimer, the term of this patent is extended or adjusted under 35 U.S.C. 154(b) by 24 days.

(21) Appl. No.: 13/697,099

(22) PCT Filed: May 11, 2011

(86) PCT No.: PCT/US2011/036080
§ 371 (c)(1),
(2), (4) Date: Dec. 31, 2012

(87) PCT Pub. No.: WO2012/009043
PCT Pub. Date: Jan. 19, 2012

(65) Prior Publication Data
US 2013/0130047 A1  May 23, 2013

Related U.S. Application Data

(60) Provisional application No. 61/363,397, filed on Jul. 12, 2010.

(51) Int. Cl.
*B32B 27/08* (2006.01)
*B29C 47/00* (2006.01)
*B32B 27/32* (2006.01)
*B32B 27/16* (2006.01)

(52) U.S. Cl.
CPC ............... *B32B 27/08* (2013.01); *B32B 27/322* (2013.01); *B32B 2250/242* (2013.01); *B32B 27/32* (2013.01); *B32B 2270/00* (2013.01); *B32B 2274/00* (2013.01); *B32B 2307/5825* (2013.01); *B32B 2307/546* (2013.01); *B32B 2553/00* (2013.01); *B32B 2250/24* (2013.01); *B32B 2307/514* (2013.01); *B32B 27/16* (2013.01)
USPC .................... 428/515; 156/244.1; 156/244.23

(58) Field of Classification Search
None
See application file for complete search history.

(56) References Cited

U.S. PATENT DOCUMENTS

2001/0021460 A1  9/2001  Kong et al.
2007/0287007 A1  12/2007  Williams et al.
2011/0020615 A1  1/2011  Van Den Bossche et al.

FOREIGN PATENT DOCUMENTS

WO  WO 2007/115816  10/2007
WO  WO 2010/033276  3/2010
WO  WO 2010/043084  4/2010

OTHER PUBLICATIONS

Glenn Williams et al. "Films from Vistamaxx™ Specialty Elastomers", Dec. 16, 2006, FlexPack Conference 2006, Paper and Presentation, Orlando.
Srivatsan Srinivas et al. "Vistamaxx Specialty Elastomers, Novel Polyolefin Polymers from ExxonMobil Chemical", Paper and Presentation, Flexcon Conference, Sep. 2003, Chicago.

*Primary Examiner* — Sheeba Ahmed
(74) *Attorney, Agent, or Firm* — Kevin M. Faulkner; Leandro Arechederra, III

(57) ABSTRACT

This disclosure relates to a laminate film that includes an oriented, polymeric film and a polyolefinic substrate. The oriented, polymeric film includes about 60.0 to about 95.0 wt % of a first polymer and about 5.0 to about 40.0 wt % of a propylene-based elastomer. The polyolefinic substrate is laminated to the first surface of the first surface layer.

21 Claims, No Drawings

LAMINATE FILM AND METHOD OF MAKING THE SAME

PRIORITY CLAIM

This application is a National Stage Application of International Application No. PCT/US2011/036080, filed May 11, 2011, which claims the benefit of prior U.S. Provisional Application No. 61/363,397, filed Jul. 12, 2010, both of which are hereby incorporated by reference in their entirety.

FIELD OF THE INVENTION

This invention relates generally to a laminate film structure and the method of making the same. More particularly this invention relates to a laminate film structure having improved lamination bond strength.

BACKGROUND OF THE INVENTION

Generally, in the preparation of a film from granular or pelleted polymer resin, the polymer is first extruded to provide a stream of polymer melt, and then the extruded polymer is subjected to the film-making process. Film-making typically involves a number of discrete procedural stages including melt film formation, quenching and windup. For a general description of these and other processes associated with film-making, see K. R. Osborn and W. A. Jenkins, Plastic Films: Technology and Packaging Applications, Technomic Publishing Co., Inc., Lancaster, Pa. (1992).

Orientation is accomplished by heating a polymer to a temperature at or above its glass-transition temperature ($T_g$) but below its crystalline melting point ($T_m$), and then stretching the film at a desirable rate. On cooling, the molecular alignment imposed by the stretching competes favorably with crystallization and the drawn polymer molecules condense into a crystalline network with crystalline domains (crystallites) aligned in the direction of the drawing force. Biaxial orientation is employed to more evenly distribute the strength qualities of the film in two directions. Biaxially oriented films tend to be stiffer and stronger, and also exhibit much better resistance to flexing or folding forces and tearing, leading to their greater utility in most packaging applications.

In flexible laminate film structures, an oriented film is adhered to a substrate film. While films may be readily bonded together through an adhesive, it is known that the initial bond strength degrades over a period of days. After used in packaging and shipped to consumers, the film may experience significantly reduced properties, including delamination. Thus, it would be highly desirable to have a film with acceptable initial bond strength that does not degrade as rapidly as in currently available film laminates.

SUMMARY OF THE INVENTION

In one aspect, embodiments of the invention provide a laminate film comprising an oriented, polymeric film comprising: a first surface layer having a first surface and a second surface, comprising 1) about 60.0 to about 95.0 wt % of a first polymer; and 2) about 5.0 to about 40.0 wt % of a propylene-based elastomer; and a polyolefinic substrate laminated to the first surface of the first surface layer.

Particular embodiments provide a laminate film comprising:
a) an oriented, polymeric film comprising:
  i) a first surface layer having a first surface and a second surface, comprising 1) about 82.0 to about 88.0 wt % polypropylene homopolymer or mini-random propylene copolymer and 2) about 12.0 to about 18.0 wt % of a propylene-based elastomer having an isotactic propylene triad tacticity of from 65 to 95%, a melting point by DSC equal to or less than 110° C., a heat of fusion of from 5.0 to 50.0 J/g, the propylene-based elastomer comprising:
    1) propylene-derived units in an amount of at least 75.0 wt %, based on the combined weight of components 1), 2), and 3);
    2) ethylene-derived units in an amount of at least 6.0 wt %, based on the combined weight of components 1), 2), and 3); and
    3) optionally 10.0 wt % or less of diene-derived units, based on the combined weight of components 1), 2), and 3);
  ii) a core layer comprising polypropylene and having a first side and a second side, wherein the first side of the core layer is in surface contact with the second surface of the first surface layer; the core layer optionally including a cavitating agent;
  iii) a second surface layer comprising a propylene-ethylene-butylene terpolymer, a propylene-ethylene copolymer, or a blend of polyethylene and polypropylene in surface contact with the second side of the core layer; and
b) a substrate comprising polyethylene laminated to the first surface of the first surface layer.

In another aspect, embodiments of the invention provide a method of making a laminate film. The method includes extruding a film including a first skin layer that comprises a blend of the about 75.0 to about 95.0 wt % polypropylene homopolymer or mini-random copolymer and 2) about 5.0 to about 25.0 wt % of the elastomeric propylene ethylene copolymer; orienting the film in at least one of MD, TD, or both; and laminating the polyolefinic substrate to the first skin layer of the film.

DETAILED DESCRIPTION OF EMBODIMENTS OF THE INVENTION

Embodiments of the invention described herein are related to laminated film structures. It has been found that in a laminated structure the magnitude and/or duration of the bond strength between a polyolefinic substrate (e.g., polyethylene) and a film having a skin layer incorporating a particular propylene ethylene copolymer can be improved.

In particular, it has been found that a laminate film comprising an oriented, polymeric film comprising: a first surface layer having a first surface and a second surface, comprising 1) about 60.0 to about 95.0 wt % of a first polymer and 2) about 5.0 to about 40.0 wt % of a propylene-based elastomer; and a polyolefinic substrate laminated to the first surface of the first surface layer may have such improved lamination bond strength.

Various specific embodiments, versions, and examples are described herein, including exemplary embodiments and definitions that are adopted for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

As used herein, "polymer" may be used to refer to homopolymers, copolymers, interpolymers, terpolymers, etc.

As used herein, unless specified otherwise, the term "copolymer(s)" refers to polymers formed by the polymerization of at least two different monomers. For example, the term "copolymer" includes the copolymerization reaction product of ethylene and an alpha-olefin (α-olefin), such as 1-hexene. However, the term "copolymer" is also inclusive of, for example, the copolymerization of a mixture of ethylene, propylene, 1-hexene, and 1-octene.

As used herein, unless specified otherwise, the term "terpolymer(s)" refers to polymers formed by the polymerization of at least three distinct monomers.

As used herein, unless specified otherwise, the term "elastomer" refers to a polymer with the property of elasticity.

As used herein, the term "propylene-based polymer" refers to a polymer comprising from 50.0 to <97.5 wt % of polymer units derived from propylene monomer. The lower limit of polymer units derived from propylene in particular propylene-based polymers is 60.0 wt %, 65.0 wt %, 70.0 wt %, 75.0 wt %, 80.0 wt %, 85.0 wt %, 90.0 wt %, or 95.0 wt % of polymer units derived from propylene monomer. Preferably, the remainder of the polymer units are derived from at least one other monomer, particularly an α-olefin, e.g., ethylene.

As used herein the term "substantially free" of a particular material means that the referenced material is not purposely included, except as an impurity or as may be provided due to recycling of edge trimmings, as is common practice in the film-making industry. "Substantially free" may be defined as indicating that the material is present in an amount ≤1.0 wt %, ≤0.5 wt %, ≤0.2 wt %, or ≤0.1 wt %.

As used herein the term "mini-random propylene copolymer" refers to a polymer comprising 97.5 to 99.5 wt % of polymer units derived from propylene monomer and 0.5 to 2.5 wt % of polymer units derived from at least one other monomer, particularly an a-olefin, e.g., ethylene.

As used herein the term "propylene-based elastomer" refers to a polymer having an isotactic propylene triad tacticity of from 65 to 95%, a melting point by DSC≤110° C., a heat of fusion of from 5.0 to 50.0 J/g and comprising:

1) propylene-derived units in an amount of at least 75.0 wt %;
2) ethylene-derived units in an amount of at least 3.0 wt %; and
3) optionally 10.0 wt % or less of diene-derived units, wherein the wt % values are based on the combined weight of components (1), (2), and (3).

As used herein the term "homopolymer" refers to a polymer comprising at least 99.5 wt %, preferably 99.9 wt %, of units derived from a single monomer, e.g., propylene.

As used herein, weight percent ("wt %"), unless noted otherwise, means a percent by weight of a particular component based on the total weight of the mixture containing the component. For example, if a mixture or blend contains three grams of compound A and one gram of compound B, then the compound A comprises 75 wt % of the mixture and the compound B comprises 25 wt %.

The Oriented Polymeric Film

The oriented polymeric film included in embodiments of the invention comprises at least a first skin layer a first surface. Typically, the second surface of the first skin layer is in surface contact with a first, or upper, surface of a core layer. In other embodiments, the oriented multilayer film structures includes, in addition to the first skin layer and core layer, a second skin layer in surface contact with a second (or lower) surface of the core layer. In such structures the core layer comprises the interior of the oriented polymeric film and the first and second skin layers are in surface contact with opposing surfaces of the core layer. The three layers of the oriented multilayer film can, but need not necessarily, be coextruded.

In some embodiments, the core layer of the oriented multilayer film further comprises one or more tie layers. When present, tie layers are placed at the exterior portion of the core layer to act as interface for contacting the first and/or second skin layer. For example, in one embodiment, the tie layers form the outer portions of the core layer such that the tie layers are from the region between an interior portion of the core layer and the first and/or second skin layers. The tie layers can comprise any polymer which holds together the two layers to be joined. While the tie layers are described as a portion of the core layer, one skilled in the art will appreciate that this description is a formality and tie layers may also be described as separate layers, formed by coextrusion, and may be the same or different composition as the interior portion of the core.

The core layer of the structures of the present invention comprises polypropylene, highly crystalline polypropylene, high density polyethylene, or blends thereof. In other embodiments, the core and optional tie layers of the oriented multilayer film may comprise a propylene polymer, ethylene polymer, isotactic polypropylene ("iPP"), high crystallinity polypropylene ("HCPP"), low crystallinity polypropylene, isotactic and syndiotactic polypropylene, ethylene-propylene ("EP") copolymers, and combinations thereof.

The oriented polymeric film of this disclosure may be uniaxially or biaxially oriented. Orientation in the direction of extrusion is known as machine direction ("MD") orientation. Orientation perpendicular to the direction of extrusion is known as transverse direction ("TD") orientation. Orientation may be accomplished by stretching or pulling a film first in the MD followed by the TD. Orientation may be sequential or simultaneous, depending upon the desired film features. Preferred orientation ratios are commonly from between about 3 to about 6 times in the machine direction (MD) and between about 4 to about 10 times in the traverse direction (TD). During the process of biaxial orientation, a cast material is typically heated (optionally including a pre-heating stage) to its orientation temperature and subjected to MD orientation between two sets of rolls, the second set rotating at a greater speed than the first by an amount effective to obtain the desired draw ratio. Then, the monoaxially oriented sheet is oriented in the TD by heating (again optionally including pre-heating) the sheet as it is fed through an oven and subjected to transverse stretching in a tenter frame.

The biaxial orientation can also be carried out simultaneously by orienting on a line which utilizes linear motors to directly propel opposed pairs of tenter clips synchronously. The use of linear motors to directly propel tenter clips to effect simultaneous biaxial stretching is disclosed in U.S. Pat. No. 4,853,602 to Hommes et al., the contents of which is incorporated herein by reference.

The biaxial orientation of the substrate, including any pre-heating step as well as the stretching steps, can be performed using stretch temperatures in the range of from above the glass transition temperature (Tg) of the substrate to near the crystalline melting point (Tm) of the substrate. More specifically, orientation in the MD is conducted at from about 70° C. to about 130° C., more preferably from about 70° C. to about 120° C. The film is typically heat set to a temperature between about 70° C. and 100° C. after the MD orientation. The film is then reheated and stretched in the TD. Orientation in the TD is conducted at from about 120° C. to about 150° C., more preferably from about 120° C. to about 140° C. The skilled artisan will understand that the orientation temperature employed in a particular situation will generally depend upon the residence time of the base sheet and the size of the rolls. Apparatus temperature higher than the Tm of the polyolefin sheet can be appropriate if the residence time is short. The skilled artisan also understands that the temperatures involved in these processes are in relation to the measured or set temperatures of the equipment rather than the temperature of the polyolefin itself, which generally cannot be directly measured.

The First Polymer

The first skin layer of the oriented polymeric film comprises about 60.0 to about 95.0 wt % of a first polymer. In some embodiments, the first layer comprises 75.0 to 90.0, or 82 to 88.0 wt % of the first polymer. The first polymer of the first skin layer may be a polymer of an olefin monomer having 2 to 10 carbons. Examples of first polymer include polyethylene, polypropylene, and isotactic propylene homopolymer. Suitable isotactic propylene homopolymers for the first polymer include e.g., ExxonMobil PP 4712, TOTAL 3371 (an isotactic polypropylene homopolymer) and Total 3270 (an isotactic high crystallinity polypropylene homopolymer). In certain embodiments the first polymer comprises a polypropylene homopolymer or mini-random propylene copolymer, e.g., a propylene copolymer comprising ≤2.0 wt %, preferably ≤1.0 wt %, ethylene-derived units.

The Propylene-Based Elastomer

The first layer generally includes 5.0-25.0 wt %, particularly 10.0-25.0 wt %, more particularly 10.0-20.0 wt % of a propylene-based elastomer having an isotactic propylene triad tacticity of from 65 to 95%, a melting point by DSC equal to or less than 110° C., a heat of fusion of from 5 to 50 J/g, the propylene-based elastomer comprising:

1) propylene-derived units in an amount of at least 75 wt %; based on the combined weight of components 1), 2), and 3);

2) ethylene-derived units in an amount of at least 3.0 wt %, based on the combined weight of components 1), 2), and 3); and 3) optionally 10 wt % or less of diene-derived units, based on the combined weight of components 1), 2), and 3).

In certain embodiments, the propylene-based elastomer has a melting temperature ($T_m$) in the range of 60° C. to about 150° C., preferably in the range of about 80° C. to about 150° C., or in the range of about 60° C. to 140° C., more preferably in the range of about 80° C. to about 120° C., and most preferably in the range of about 85° C. to about 110° C.

Some propylene-based elastomers have a single peak melting transition as determined by DSC; in certain embodiments the propylene-based elastomer has a primary peak melting transition from less than 90° C., with a broad end-of-melt transition from greater than about 110° C. The peak "melting point" ($T_m$) is defined as the temperature of the greatest heat absorption within the range of melting of the sample. However, the propylene-based elastomer may show secondary melting peaks adjacent to the principal peak, and/or the end-of-melt transition, but for purposes herein, such secondary melting peaks are considered together as a single melting point, with the highest of these peaks being considered the $T_m$ of the propylene-based elastomer. The propylene-based elastomers have a peak melting temperature ($T_m$) from about 60° C. or 70° C. or 80° C. or 90° C. or 100° C. or 105° C. to less than about 100° C. or 110° C. or 120° C. or 130° C. or 135° C. or 136° C. or 138° C. or 139° C. or 140° C. or 145° C. or 150° C. or 155° C. or 160° C. in some embodiments.

The procedure for DSC determinations is as follows. About 0.5 grams of polymer is weighed out and pressed to a thickness of about 15-20 mils (about 381-508 microns) at about 140° C.-150° C., using a "DSC mold" and Mylar™ as a backing sheet. The pressed pad is allowed to cool to ambient temperature by hanging in air (the Mylar is not removed). The pressed pad is annealed at room temperature (about 23° C.-25° C.) for about 8 days. At the end of this period, an about 15-20 mg disc is removed from the pressed pad using a punch die and is placed in a 10 µL aluminum sample pan. The sample is placed in a differential scanning calorimeter (Perkin Elmer Pyris 1 Thermal Analysis System) and cooled to about −100° C. The sample is heated at about 10° C./min to attain a final temperature of about 165° C. The thermal output, recorded as the area under the melting peak of the sample, is a measure of the heat of fusion and can be expressed in Joules per gram (J/g) of polymer and is automatically calculated by the Perkin Elmer System. Under these conditions, the melting profile shows two (2) maxima, the maximum at the highest temperature was taken as the melting point within the range of melting of the sample relative to a baseline measurement for the increasing heat capacity of the polymer as a function of temperature.

In certain embodiments, the propylene-based elastomer comprises ethylene or $C_4$-$C_{10}$ α-olefin-derived units (or "comonomer-derived units") within the range from 5.0 or 7.0 or 8.0 or 10.0 to 11.0 wt % by weight of the copolymer. The propylene-based elastomer may also comprise two different comonomer-derived units. Also, these copolymers and terpolymers may comprise diene-derived units as described below. In a particular embodiment, the propylene-based elastomer comprises propylene-derived units and comonomer units selected from ethylene, 1-hexene and 1-octene. And in a more particular embodiment, the comonomer is ethylene, and thus the propylene-based elastomer is a propylene-based elastomer.

In one embodiment, the propylene-based elastomer comprises from less than 10.0 or 8.0 or 5.0 or 3.0 wt % of the copolymer or terpolymer, of diene derived units (or "diene"), and within the range from 0.1 or 0.5 or 1.0 to 5.0 or 8.0 or 10.0 wt % in yet another embodiment. Suitable dienes include for example: 1,4-hexadiene, 1,6-octadiene, 5-methyl-1,4-hexadiene, 3,7-dimethyl-1,6-octadiene, dicyclopentadiene (DCPD), ethylidiene norbomene (ENB), norbomadiene, 5-vinyl-2-norbomene (VNB), and combinations thereof. The diene, if present, is most preferably ENB.

In certain embodiments, the propylene-based elastomers have a triad tacticity of three propylene units, as measured by $^{13}C$ NMR, from greater than 75% or 80% or 82% or 85% or 90%. In one embodiment, the triad tacticity is within the range from 50 to 99%, and from 60 to 99% in another embodiment, and from 75 to 99% in yet another embodiment, and from 80 to 99% in yet another embodiment; and from 60 to 97% in yet another embodiment. Triad tacticity is determined as follows: The tacticity index, expressed herein as "m/r", is determined by $^{13}C$ nuclear magnetic resonance (NMR). The tacticity index m/r is calculated as defined by H. N. Cheng in 17 MACROMOLECULES 1950 (1984). The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios from greater than 50. Embodiments of the propylene-based elastomer have a tacticity index m/r within the range from 4 or 6 to 8 or 10 or 12.

In certain embodiments, the propylene-based elastomers have a heat of fusion ($H_f$), determined according to the Differential Scanning calorimetry (DSC) procedure described herein, within the range from 0.5 or 1 or 5 J/g, to 35 or 40 or 50 or 65 or 75 J/g. In certain embodiments, the $H_f$ value is from less than 75 or 65 or 55 J/g.

In certain embodiments, the propylene-based elastomers have a percent crystallinity within the range from 0.5 to 40%, and from 1 to 30% in another embodiment, and from 5 to 25% in yet another embodiment, wherein "percent crystallinity" is determined according to the DSC procedure described herein. (The thermal energy for the highest order of polypropylene is estimated at 189 J/g (i.e., 100% crystallinity is equal to 189 J/g).) In another embodiment, the propylene-based elastomer has a percent crystallinity from less than 40% or 25% or 22% or 20%.

In certain embodiments, the propylene-based elastomers have a density within the range from 0.840 to 0.920 g/cm$^3$, and from 0.845 to 0.900 g/cm$^3$ in another embodiment, and from 0.850 to 0.890 g/cm$^3$ in yet another embodiment, the values measured at room temperature per the ASTM D-1505 test method.

In certain embodiments, the propylene-based elastomers have a Shore A hardness (ASTM D2240) within the range from 10 or 20 to 80 or 90 Shore A. In yet another embodiment, the propylene-based elastomers possess an Ultimate Elongation from greater than $5.0 \times 10^2$% or $1.0 \times 10^3$% or $2.0 \times 10^3$%; and within the range from $3.0 \times 10^2$% or $4.0 \times 10^2$% or $5.0 \times 10^2$% to $8.0 \times 10^2$% or $1.2 \times 10^3$% or $1.8 \times 10^3$% or $2.0 \times 10^3$% or $3.0 \times 10^3$% in other embodiments.

In certain embodiments, the propylene-based elastomers have a weight average molecular weight (Mw) value within the range from $2.0 \times 10^4$ to $5.0 \times 10^6$ g/mole, and from $5.0 \times 10^4$ to $1 \times 10^6$ g/mole in another embodiment, and from $7.0 \times 10^4$ to $4.0 \times 10^5$ g/mole in yet another embodiment. In another embodiment, the propylene-based elastomers have a number average molecular weight (Mn) value within the range from $4.5 \times 10^3$ to $2.5 \times 10^6$ g/mole, and from $2.0 \times 10^4$ to $2.5 \times 10^5$ g/mole in yet another embodiment, and from $5.0 \times 10^4$ to $2.0 \times 10^5$ g/mole in yet another embodiment. In yet another embodiment, the propylene-based elastomers have a z-average molecular weight (Mz) value within the range from $2.0 \times 10^4$ to $7.0 \times 10^6$ g/mole, and from $1.0 \times 10^5$ to $7.0 \times 10^5$ g/mole in another embodiment, and from $1.4 \times 10^5$ to $5.0 \times 10^5$ g/mole in yet another embodiment.

In certain embodiments, the propylene-based elastomers have a melt flow rate ("MFR", ASTM D1238, 2.16 kg, 230° C.), from less than 90 or 70 or 50 or 40 or 30 or 20 or 10 dg/min, and within the range from 0.1 or 0.5 or 1 or 5 or 10 to 20 or 30 or 40 or 50 or 70 or 90 dg/min in other embodiments.

In certain embodiments, the molecular weight distribution (MWD) of the propylene-based elastomers is within the range from 1.5 or 1.8 or 2.0 to 3.0 or 3.5 or 4.0 or 5.0 or 10.0 in particular embodiments. Techniques for determining the molecular weight (Mn, Mz and Mw) and molecular weight distribution (MWD) are as follows, and as by Verstate et al. in 21 MACROMOLECULES 3360 (1988). Conditions described herein govern over published test conditions. Molecular weight and molecular weight distribution are measured using a Waters 150 gel permeation chromatograph equipped with a Chromatix KMX-6 on-line light scattering photometer. The system is used at 135° C. with 1,2,4-trichlorobenzene as the mobile phase. Showdex™ (Showa-Denko America, Inc.) polystyrene gel columns 802, 803, 804 and 805 are used. This technique is discussed in LIQUID CHROMATOGRAPHY OF POLYMERS AND RELATED MATERIALS III 207 (J. Cazes ed., Marcel Dekker, 1981). No corrections for column spreading were employed; however, data on generally accepted standards, for example, National Bureau of Standards, Polyethylene (SRM 1484) and anionically produced hydrogenated polyisoprenes (an alternating propylene-ethylene copolymer) demonstrate that such corrections on Mw/Mn or Mz/Mw are less than 0.05 units. Mw/Mn is calculated from an elution time-molecular weight relationship whereas Mz/Mw is evaluated using the light scattering photometer. The numerical analyses can be performed using the commercially available computer software GPC2, MOLWT2 available from LDC/Milton Roy-Riviera Beach, Fla.

Propylene-based elastomers are also described in WO 05/049670, the disclosure of which is incorporated herein by reference in its entirety.

The propylene-based elastomers described herein can be produced using any catalyst and/or process known for producing polypropylenes. In certain embodiments, the propylene-based elastomers can include copolymers prepared according to the procedures in WO 02/36651, U.S. Pat. No. 6,992,158, and/or WO 00/01745. Preferred methods for producing the propylene-based elastomers are found in US Patent Application Publication 2004/0236042 and U.S. Pat. No. 6,881,800. Preferred propylene-based polyolefin polymers are available commercially under the trade names Vistamaxx™ (ExxonMobil Chemical Company, Houston, Tex., USA) and Versify™ (The Dow Chemical Company, Midland, Mich., USA), certain grades of Tafmer™ XM or Notio™ (Mitsui Company, Japan) or certain grades of Softell™ (LyondellBasell Polyolefine GmbH, Germany). In some embodiments, the propylene-based elastomer is a metallocene-catalyzed propylene-ethylene copolymer having an ethylene content of less than about 11.0 wt %, preferably less than about 9.0 wt %, and more preferably less than about 8.0 wt %. Suitable metallocene-catalyzed propylene-ethylene copolymers include ExxonMobil Chemical's Vistamaxx™ series of elastomers, particularly Vistamaxx™ 3000 having an ethylene content of 11 wt % and Vistamaxx™ 3980 having an ethylene content of 9 wt %. Particular EP elastomers include those having an ethylene content of 9 wt %. Mitsui Chemical's Notio™ series (available as PN-2070, PN-3560, PN-0040 and PN-2060) or Dow Chemical Company's Versify™ DP3200.01 are also particularly useful.

Suitable propylene-based elastomers are also described as semi-amorphous polymers in U.S. Pat. No. 7,319,077, the disclosure of which is incorporated herein by reference in its entirety.

Additives

One or more layers of the film may further contain one or more additives. Examples of useful additives include, but are not limited to, opacifying agents, pigments, colorants, cavitating agents, slip agents, antioxidants, anti-fog agents, antistatic agents, anti-block agents, moisture barrier additives, gas barrier additives, hydrocarbon resins, hydrocarbon waxes, fillers such as calcium carbonate, diatomaceous earth and carbon black, and combinations thereof. Such additives may be used in effective amounts, which vary depending upon the property required.

Examples of suitable opacifying agents, pigments, or colorants include, but are not limited to, iron oxide, carbon black, aluminum, titanium dioxide, calcium carbonate, poly terephthalate, talc, beta nucleating agents, and combinations thereof.

Cavitating agents or void-initiating particles may be added to one or more layers of the film to create an opaque film. Preferably, the cavitating agents or void-initiating particles are added to the core layer. Generally, the cavitating or void-initiating additive includes any suitable organic or inorganic material that is incompatible with the polymer material(s) contained in the layer(s) to which the cavitating or void-initiating additive is added, at the temperature of biaxial orientation. Examples of suitable void-initiating particles include, but are not limited to, polybutylene terephthalate ("PBT"), nylon, cyclic-olefin copolymers, solid or hollow pre-formed glass spheres, metal beads or spheres, ceramic spheres, calcium carbonate, talc, chalk, or combinations thereof. The average diameter of the void-initiating particles typically ranges from about 0.1 µm to 10 µm. The particles may be of any desired shape, or preferably they are substantially spherical in shape. Preferably, the cavitating agents or void-initiating particles are present in the layer at less than 30 wt %, or less than 20 wt %, or most preferably in the range of 2 wt % to 10 wt %, based on the total weight of the layer. Alternatively, one or more layers of the film may be cavitated by beta nucleation, which includes creating beta-form crystals of polypropylene and converting at least some of the beta-crystals to alpha-form crystals thus leaving small voids remaining after the conversion.

Slip agents that may be used include, but are not limited to, higher aliphatic acid amides, higher aliphatic acid esters, waxes, silicone oils, and metal soaps. Such slip agents may be used in amounts in the range of 0.1 wt % to 2 wt % based on the total weight of the layer to which it is added. An example of a fatty acid slip additive that may be used is erucamide. In one embodiment, a conventional polydialkylsiloxane, such as silicone oil or silicone gum, additive having a viscosity of 10,000 to 2,000,000 cSt is used.

Non-migratory slip agents may be used in one or more of the outer surface layers of the films. Non-migratory means that these agents do not generally change location throughout the layers of the film in the manner of migratory slip agents. A preferred non-migratory slip agent is polymethyl methacrylate ("PMMA"). The non-migratory slip agent may have a mean particle size in the range of 0.5 µm to 15 µm, or 1 µm to 10 µm, or 1 µm to 5 µm, or 2 µm to 4 µm, depending on the layer's thickness and desired slip properties. Alternatively, the size of the particles in the non-migratory slip agent, such as PMMA, may be greater than 10% of the thickness of the surface layer containing the slip agent, or greater than 20% of the layer's thickness, or greater than 50% of the layer's thickness, or in some embodiments greater than 100% of the layer's thickness. Generally spherical, particulate non-migratory slip agents are contemplated. A commercially available example of a PMMA resin is EPOSTAR™ which is available from Nippon Shokubai Co., Ltd. of Japan.

An example of a suitable antioxidant includes phenolic anti-oxidants, such as IRGANOX® 1010, which is commercially available from Ciba-Geigy Company of Switzerland. Such an antioxidant may be used in an amount ranging from 0.1 wt % to 2 wt %, based on the total weight of the layer to which it is added.

Anti-static agents that may be used include alkali metal sulfonates, polyether-modified polydiorganosiloxanes, polyalkylphenylsiloxanes, tertiary amines, glycerol mono-stearate, blends of glycerol mono-stearate and tertiary amines, and combinations thereof. Such anti-static agents may be used in amounts in the range of about 0.05 wt % to 3 wt %, based on the total weight of the layer to which the anti-static is added. An example of a suitable anti-static agent is ARMOSTAT™ 475, commercially available from Akzo Nobel.

Useful antiblock additives include, but are not limited to, silica-based products such as inorganic particulates such as silicon dioxide, calcium carbonate, magnesium silicate, aluminum silicate, calcium phosphate, and the like. Other useful antiblock additives include polysiloxanes and non-meltable crosslinked silicone resin powder, such as TOSPEARL™, which is commercially available from Toshiba Silicone Co., Ltd. Anti-blocking agents may be effective in amounts up to about 30,000 ppm of the layer to which it is added.

Examples of useful fillers include but are not limited to, finely divided inorganic solid materials such as silica, fumed silica, diatomaceous earth, calcium carbonate, calcium silicate, aluminum silicate, kaolin, talc, bentonite, clay, and pulp.

Suitable moisture and gas barrier additives may include effective amounts of low-molecular weight resins, hydrocarbon resins, particularly petroleum resins, styrene resins, cyclopentadiene resins, and terpene resins. The film may also contain a hydrocarbon wax in one or more layers. The hydrocarbon wax may be either a mineral wax or a synthetic wax. Hydrocarbon waxes may include paraffin waxes and microcrystalline waxes. Typically, paraffin waxes having a broad molecular weight distribution are preferred as they generally provide better barrier properties than paraffin waxes with a narrow molecular weight distribution.

Optionally, one or more of the outer surface layers may be compounded with a wax or coated with a wax-containing coating, for lubricity, in amounts in the range of 2 wt % to 15 wt % based on the total weight of the layer.

The Polyolefinic Substrate

The polyolefinic substrate may be any polyolefin homopolymers, copolymers, terpolymers, etc. In particular embodiments the polyolefinic substrate comprises a polyethylene homopolymer or copolymer, a polypropylene homopolymer or mini-random copolymer, or blend thereof. In particular embodiments the polyolefinic substrate comprises a high density polyethylene (HDPE).

Methods of Making Films

Embodiments of the invention also include methods of making film. Such methods include: a) extruding a film including a first skin layer comprising: 1) a blend of the about 75.0 to about 95.0 wt % polypropylene homopolymer or mini-random copolymer and 2) about 5.0 to about 25.0 wt % of the propylene-based elastomer; b) orienting the film in at least one of MD, TD, or both; and c) laminating the polyolefinic substrate to the first skin layer of the film. Particular methods also include further comprising treating the surface of the first skin layer by corona, flame, or plasma discharge prior to laminating the polyolefinic substrate to the first skin layer of the film.

One method of carrying out such a method involves cast extrusion of a sheet of polymer (typically 500 µm to 650 µm thick) followed by orientation, either in the machine direction, the transverse direction, or both at elevated temperature on a stretching apparatus. Preferably, the stretching profile offers even stretching, without unacceptable stretch bands, breakage or sagging over a wide range of stretching temperatures. A typical commercial tenter frame process to make biaxially oriented polypropylene film, operating at 250 m/min. line speed and with TD stretch ratio 850% (i.e., 1 m wide film stretched to 8.5 m), has a TD-stretch strain rate of about 15,000% per minute.

EXAMPLES

Comparative Example 1 is a three layer film wherein the first skin layer and the core layer comprise polypropylene homopolymer (PP-4712, available from ExxonMobil Chemical Company). The second skin layer of Comparative Example 1 is a propylene-ethylene random polymer containing 3.5 wt % ethylene (8573HB, available from Total Petrochemicals).

After coextrusion the film of Comparative example 1 is biaxially oriented in the machine direction (MD) for 5X and transverse direction (TD) for 8X. The oriented film is then surface treated by corona discharge before being extrusion laminated at a temperature of 315° C. to 350° C. (600° F. to 650° F.) to the corona-discharge treated polyethylene side of 18LPX oriented polypropylene film (available from Exxon-Mobil Films) using LDPE, having a density of 0.917 g/cc, and a melt index of 7.0 g/10 min (according to ASTM-D1238 at 2.16 kg and 190° C., available as MarFlex-1017 from Chevron Phillips Chemical Co.) as the extrusion lamination adhesive.

Comparative Example 2 is substantially identical to Comparative Example 1 except that the first skin layer includes 10 wt % ethylene-propylene-butylene terpolymer (Adflex T-100F).

Comparative Example 3 is substantially identical to Comparative Example 2 except that the first skin layer comprises 85.0 wt % ethylene-propylene-butylene terpolymer and 15.0 wt % of the propylene-based elastomer having about 4.4 wt % ethylene (available from ExxonMobil Chemical Company as Vistamaxx™, BCT-29030).

Comparative Example 4 is substantially identical to Comparative Example 3 except that the first skin layer comprises 70.0 wt % ethylene-propylene-butylene terpolymer and 30.0 wt % of the propylene-based elastomer having about 4.4 wt % ethylene (available from ExxonMobil Chemical Company as Vistamaxx™, BCT-29030).

Example 1 is substantially identical to Comparative Example 1 except that the first skin layer comprises 70.0 wt % polypropylene homopolymer and 30.0 wt % of a propylene-based elastomer having about 6.0 wt % ethylene (available from ExxonMobil Chemical Company as Vistamaxx™, BCT-29029).

Example 2 is substantially identical to Comparative Example 1 except that the first skin layer comprises 70.0 wt % polypropylene homopolymer and 30.0 wt % of a propylene-based elastomer having about 4.4 wt % ethylene (available from ExxonMobil Chemical Company as Vistamaxx™, BCT-29030).

The bond strength test is performed by applying 610 tape to both sides of the laminated film structure. The sample is cut into 1" strips. An Instron or Sintech tester is allowed to warm up and adjusted to the following settings: Jaw Separation 1-inch±⅟₃₂; Cross head speed 12 inches/min. The sample is loaded into a 5 lb. load cell. The reported lamination bond strength is the average pulling force determined from 5 separate measurements according to well-known statistical methods including proper treatment of "outlier" data points.

These structures and their bond strengths are summarized in Table 1.

TABLE 1

Structures and Properties of Examples

| Example | 1$^{st}$ Skin Layer | Core | 2$^{nd}$ Skin Layer | Initial peel force | Failure Mode† | 7 day peel force | Failure Mode |
|---|---|---|---|---|---|---|---|
| CE1 | 100 wt % PP-4712 | PP-4712 | EP (Total-8573) | 39.4 | N/A | 11.8 | N/A |
| CE2 | 90.0 wt % PP4712 10.0 wt % Adflex T-100F | PP-4712 | EP (Total-8573) | 204 | PS | 16.1 | N/A |
| CE 3 | 85.0 wt % JPP-7510 EPB 15.0 wt % Vistamaxx-29030 | PP-4712 | EP (Total-8573) | 331 | PT | 27.2 | N/A |
| CE 4 | 70.0 wt % JPP-7510 EPB 30.0 wt % Vistamaxx-29030 | PP-4712 | EP (Total-8573) | 236 | PS | 16.5 | N/A |
| Ex 1 | 70.0 wt % PP-4712 30.0 wt % Vistamaxx-29029 | PP-4712 | EP (Total-8573) | 238 | PS | 138 | PS |
| Ex. 2 | 70.0 wt % PP-4712 30.0 wt % Vistamaxx-29030 | PP-4712 | EP (Total-8573) | 303 | PT | 198 | PS |

†PT indicates that the film failed by tearing; PS indicates the film failed by stretching The data surprisingly shows that the lamination bond strength can be significantly improved with the addition of particular propylene-ethylene copolymers. Also surprising is that similar improvement was not observed in Comparative Examples 3 and 4 where the propylene-ethylene copolymer was used in the presence of the EPB terpolymer skin.

The foregoing examples have been provided merely for the purpose of explanation and are in no way to be construed as limiting of this disclosure. While the invention has been described with respect to a limited number of embodiments, the specific features of one embodiment should not be attributed to other embodiments of the invention. No single embodiment is representative of all aspects of the invention. Moreover, variations and modifications therefrom exist. Various additives may also be used to further enhance one or more properties. In other embodiments, the composition consists essentially of, or consists of, the enumerated components described herein. In some embodiments, the composition is substantially free of any additive not specifically enumerated herein. The appended claims intend to cover all such variations and modifications as falling within the scope of the invention.

What is claimed is:
1. A laminate film, comprising:
    a) an oriented, polymeric film comprising:
        a first surface layer having
            a first surface and
            a second surface, comprising 1) 60.0 to 95.0 wt % of a propylene-based polymer and 2) 5.0 to 40.0 wt % of a propylene-based elastomer;
        the first surface being treated as by corona, flame, or plasma discharge; and
        wherein the propylene-based elastomer comprises from 3 to 9 wt % ethylene-derived units; and b) a polyolefinic substrate having been treated as by corona, flame, or plasma discharge laminated to the first surface of the first surface layer;
further including a polyethylene adhesive between the first surface layer or the second surface layer of the oriented, polymeric film and the polyolefinic substrate.

2. The film of claim 1, wherein the first polymer comprises polypropylene homopolymer or a mini-random propylene copolymer.

3. The film of claim 2, wherein the mini-random propylene copolymer comprises ≤1.0 wt % ethylene-derived units.

4. The film of any one of the preceding claims, wherein the oriented, polymeric film further comprises:
   a) a core layer having a first surface and a second surface, the first surface of the core layer in surface contact with the second surface of the first surface layer, the core layer comprising polypropylene homopolymer or mini-random copolymer; and
   b) a polymeric second surface layer having a first surface and a second surface, the first surface of the second surface layer in surface contact with the second layer of the core layer.

5. The film of claim 1, wherein the core layer comprises intermediate layers on opposing sides of a central layer.

6. The film of claim 1, wherein the first surface layer comprises 10.0-35.0 wt % of the propylene-based elastomer.

7. The film of claim 1, wherein the first surface layer comprises 15.0-30.0 wt % of the propylene-based elastomer.

8. The film of claim 1, wherein the first surface layer comprises 12.0-18.0 wt % of the propylene-based elastomer.

9. The film of claim 1, wherein the polyolefinic substrate comprises polyethylene.

10. The film of claim 1, wherein initial bond strength between the first surface of the first surface layer and the surface of the polyolefinic substrate is ≥500 g/in.

11. The film of claim 1, wherein initial bond strength between the first surface of the first surface layer and the surface of the polyolefinic substrate is ≥800 g/in.

12. The film of claim 1, wherein initial bond strength between the first surface of the first surface layer and the surface of the polyolefinic substrate is 600 g/in to 1100 g/in.

13. The film of claim 1, wherein a 7-day bond strength between the first surface of the first surface layer and the surface of the polyolefinic substrate is 300 to 550 g/in.

14. The film of claim 1, wherein the 7-day bond strength is 55 to 80% of the initial bond strength.

15. The film of claim 1, wherein the first surface layer is substantially free of a propylene-ethylene copolymer other than the propylene based elastomer or the propylene copolymer.

16. The film of claim 1, wherein the first surface layer is substantially free of an ethlyene-propylene-butylene terpolymer.

17. The film of claim 1, wherein the first surface layer is substantially free of a propylene-butylene copolymer other than a mini-random propylene-butylene copolymer.

18. The film of claim 1, wherein the polymeric second surface layer comprising a propylene homopolymer, a mini-random propylene copolymer, a propylene-ethylene copolymer, a propylene-ethylene-butylene terpolymer, an ethylene homopolymer, or mixtures thereof.

19. A laminate film comprising:
   a) an oriented, polymeric film comprising:
      i) a first surface layer having
         a first surface and
         a second surface, comprising:
         (1) 82.0 to 88.0 wt % polypropylene homopolymer or mini-random propylene copolymer, and
         (2) 12.0 to 18.0 wt % of a propylene-based elastomer having an isotactic propylene triad tacticity of from 65 to 95%, a melting point by DSC equal to or less than 110° C., a heat of fusion of from 5.0 to 50.0 J/g, the propylene-based elastomer comprising from 3 to 9 wt % ethylene-derived units;
         the first surface being treated as by corona, flame, or plasma discharge;
      ii) a core layer comprising polypropylene and having
         a first side and
         a second side,
         wherein the first side of the core layer is in surface contact with the second surface of the first surface layer;
         the core layer optionally including a cavitating agent; and
      iii) a second surface layer comprising a propylene-ethylene-butylene terpolymer, a propylene-ethylene copolymer, or a blend of polyethylene and polypropylene;
   b) a substrate comprising polyethylene; and
   c) an polyethylene adhesive between the oriented polymeric film and the substrate.

20. A method of making film of claim 1 comprising:
   a) extruding a film including a first skin layer comprising:
      1) a blend of the 75.0 to 95.0 wt % polypropylene homopolymer or mini-random copolymer, and
      2) 5.0 to 25.0 wt % of the propylene-based elastomer;
   b) orienting the film in at least one of MD, TD, or both; and
   c) laminating the polyolefinic substrate to the first skin layer of the film;
   wherein the 7-day bond strength is 55 to 80% of the initial bond strength.

21. The method of claim 20, further comprising treating the surface of the first skin layer by corona, flame, or plasma discharge prior to laminating the polyolefinic substrate to the first skin layer of the film.

* * * * *